United States Patent [19]

Elterman

[11] Patent Number: 5,505,422
[45] Date of Patent: Apr. 9, 1996

[54] TOP ADJUSTABLE KINEMATIC MOUNT

[75] Inventor: Paul B. Elterman, Cambridge, Mass.

[73] Assignee: Bio-Rad Laboratories, Hercules, Calif.

[21] Appl. No.: 252,725

[22] Filed: Jun. 2, 1994

[51] Int. Cl.[6] .................................................. A47G 1/24
[52] U.S. Cl. ...................... 248/476; 248/274.1; 359/872
[58] Field of Search .................................... 248/274, 279, 248/285, 286, 287, 476, 477, 478, 479, 480, 485, 486, 487; 359/872

[56] References Cited

U.S. PATENT DOCUMENTS

| | | | |
|---|---|---|---|
| 4,268,123 | 5/1981 | Mesco | 248/488 |
| 5,004,205 | 4/1991 | Brown et al. | 248/476 |
| 5,065,974 | 11/1991 | Lapp | 248/476 |
| 5,305,981 | 4/1994 | Cunningham et al. | 248/500 |
| 5,353,167 | 10/1994 | Kuklo et al. | 359/872 X |

*Primary Examiner*—Ramon O. Ramirez
*Attorney, Agent, or Firm*—Townsend and Townsend and Crew

[57] ABSTRACT

A kinematic mount assembly where the relative orientation of a mounted item may be adjusted from above the mounted item. The mount assembly including a first element to which the mounted item is secured and a second element. The first and second elements are L-shaped and biased toward each other to form a generally rectangular tube. The first element includes three adjustable engagement elements which contact three engagement portions on the second element. The three contact points of the engagement elements and portions define a reference plane which is not generally perpendicular to the direction of motion of the adjustable engagement elements. Adjustment of engagement elements changes the orientation of the mounted item along two non-parallel axes within the plane of the mounted item.

23 Claims, 4 Drawing Sheets

TOP ADJUSTABLE KINEMATIC MOUNT

BACKGROUND OF THE INVENTION

The present invention relates generally to adjustable mounting mechanisms and more specifically to a variation of an adjustable mounting mechanism known as a kinematic mount.

A kinematic mount is a known mechanism for coupling two elements so that their relative orientation may be adjusted. In a typical configuration, the first element has three engagement elements that engage the second element at three engagement portions, the first and second elements are biased toward each other, and at least two of the engagement elements are protrusions that are adjustable to provide the desired orientation. The other engagement element, whether or not adjustable, is also typically formed as a protrusion.

The adjustable protrusions are typically implemented as adjustment screws, carried by the first element and having rounded, possibly hemispherical, ends that engage the second element. The second element is formed with portions that engage the protrusions, typically a portion surrounding a hemispherical hole or a conical hole, a portion surrounding a semi-cylindrical groove or a V-groove, and a flat portion. The bottom of the groove is typically in line with the center of the hole, and the flat portion is to one side of the groove.

The three points at which the first element engages the second element may be thought of as defining a reference plane, with the normal to the reference plane defining a reference direction. A setting where the adjustment screws extend perpendicular to the reference plane can be considered a nominal zero-tilt setting. If the first element is considered to be characterized by an axis that extends parallel to the direction of the screws, the mount allows the first element to be tilted so that its axis has desired components along two non-parallel directions perpendicular to the reference direction.

One known use of a kinematic mount is in optical instruments where the tilt angles of mirrors have to be adjusted. In a typical instrument, the mirror is vertical and must be mounted to a horizontal optical bench. Tilt adjustments may be provided by mounting a right-angled bracket having an approximately vertical plate portion, mounting the mirror to a supporting plate, and configuring the vertical plate portion and the mirror-supporting plate as a kinematic mount. The adjustment screws would extend horizontally (generally perpendicular to the mirror surface). Depending on whether the adjustment screws are carried by the vertical plate portion or the mirror-supporting plate, the adjustment would be made from behind the mirror or from in front of the mirror. Since clearances tend to be rather limited, adjustments tend to be difficult.

SUMMARY OF THE INVENTION

The present invention provides a kinematic mount that allows the tilt angles of a vertical element to be adjusted from the top. This facilitates adjustment and allows a more compact configuration since clearance for adjustment is not a significant issue. Additionally, adjustment can be accomplished in optical systems without interfering with the optical path.

As in the case of conventional kinematic mounts, an embodiment of the present invention includes first and second elements, biased toward each other. The first element is formed with three engagement elements, at least two of which are adjustable protrusions. The second element is formed with three engagement portions for engaging the engagement elements on the first element. Where all the engagement elements are protrusions, the engagement portions are preferably a portion surrounding a hole, a portion surrounding a groove, and a portion defining a flat surface. In such a case, the first protrusion is seated in the hole, the second protrusion is seated in the groove, and the third protrusion rides on the flat surface.

However, in a conventional kinematic mount, the portion surrounding the hole and the portion surrounding the groove are generally coplanar with the flat surface. In an embodiment of the present invention, one of the engagement portions of the second element is significantly displaced from the plane of the flat surface. Thus the reference plane that is defined by the three points where the engagement elements engage the engagement portions is no longer generally perpendicular to the direction of motion of the adjustable engagement elements, but rather departs significantly from perpendicularity.

In an embodiment of the present invention, the first and second elements are L-shaped and biased toward each other to form a generally rectangular tube. The first and second elements each have a vertical and horizontal plate portion. The first element is disposed above the second element and one engagement element is located on the bottom surface of the horizontal plate of the first element and two engagement elements are located on the bottom surface of the vertical plate of the first element. Correspondingly, a portion surrounding a hole is located on the top surface of the vertical plate of the second element and a portion surrounding a groove and a portion defining a flat surface are located on the top surface of the horizontal plate of the second element.

A further understanding of the nature and advantages of the present invention may be realized by reference to the remaining portions of the specification and the drawings.

DESCRIPTION OF SPECIFIC EMBODIMENTS

Introduction and Definitions of Directions

The specific examples of prior art kinematic mounts and kinematic mounts according to the invention will be in the context of mounting a generally vertical mirror so as to provide rotatable adjustment about two non-parallel axes in the plane of the mirror. As such, it is convenient to refer to orientations such as vertical and horizontal, and relative positions such as front and rear, upper and lower, and left and right. "Front" refers to a portion nearest a viewer looking at a particular figure. It should be understood, however, that these designations are for convenience, and should not be taken to mean that obvious inversions and reflections are excluded. In the oblique and isometric views described below, the mirror will be considered to be facing outwardly to the right.

Prior Art Kinematic Mount

Figure 1:
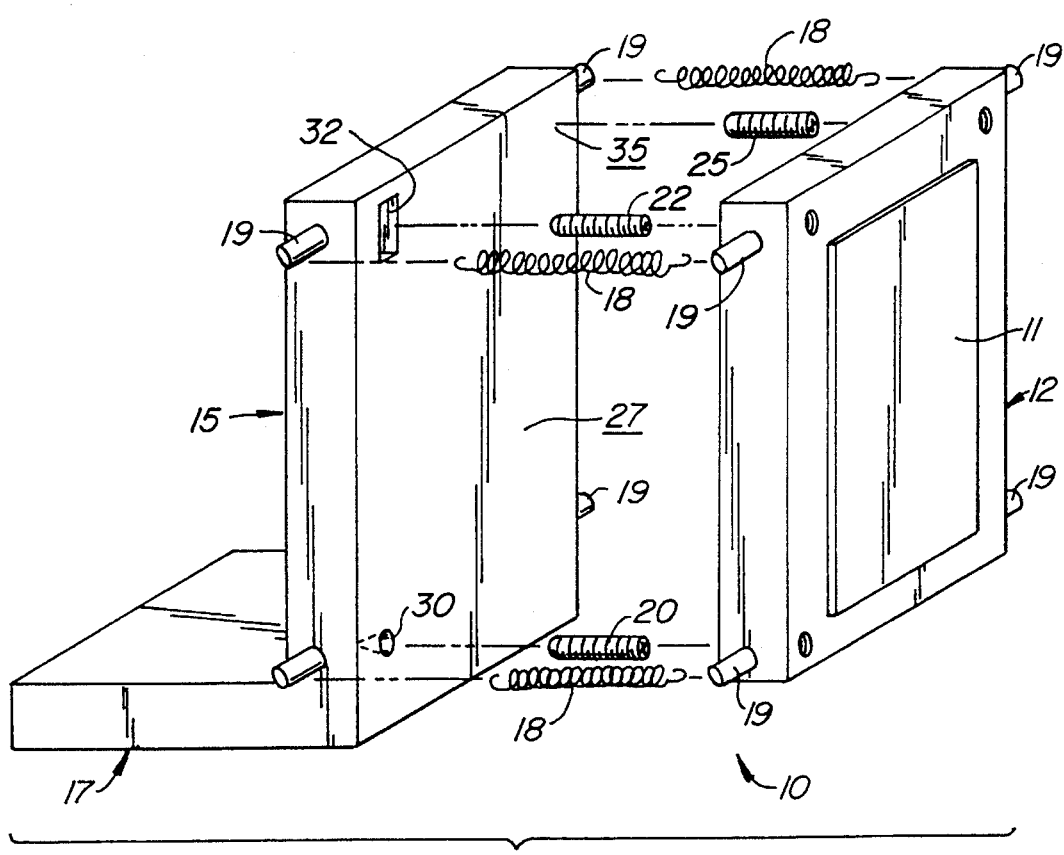
FIG. 1 is an exploded oblique view of a prior art kinematic mount.

FIG. 1 is an oblique exploded view of a prior art kinematic mount mechanism 10. The specific application is for providing adjustable tilt of a vertically mounted mirror 11 relative to a fixed structure (not shown) assumed to have a horizontal surface. This is a configuration that might be found in an optical instrument.

The mirror is mounted to the right surface of a movable, generally vertical plate 12, shown to the right of a vertical fixed plate 15. In the specific example, plate 15 is formed with a flange 17 that is bolted to a horizontal surface of the fixed structure. The two plates are biased toward each other by tension springs 18 or by any other suitable mechanism. The tension springs are supported by tension pins 19 that extend from vertical plates 12 and 15.

Plate 12 is formed with three parallel threaded holes near its lower front corner, its upper front corner, and its upper rear corner. These threaded holes accommodate respective adjustment screws 20, 22, and 25 (lead screws), which are formed with hemispherical or ball ends.

The right surface of plate 15 (shown as a flat surface 27) is formed with a conical hole 30 near its lower front corner and a V-groove 32 near its upper front corner, and a portion near its upper rear corner defines a flat bearing surface 35. The V-groove is cut along a line that passes through the center of the conical hole. When the two plates are biased toward each other, the end of screw 20 seats in conical hole 30, the end of screw 22 seats in V-groove 32, and the end of screw 25 contacts bearing surface 35.

A desired relative orientation of the two plates is obtained by adjusting the three screws. Screw 22 is typically adjusted to set the nominal separation of the plates and screws 20 and 25 are adjusted to set the tilt. If there is no need for the kinematic mount to provide an adjustable nominal separation of the plates, screw 22 can be replaced by a fixed hemispherical protrusion. Movement of screw 20 causes relative rotation about a line joining the contact points of screws 22 and 25 while movement of screw 25 causes relative rotation about a line joining the contact points of screws 20 and 22.

The screws are shown as being located so that their axes intersect flat surface 27 at points that define three corners of a rectangle. This is necessary if it is desired that the two screws provide rotation about respective orthogonal axes. As the figure is drawn, adjustment is made from in front of the mirror, i.e., from the right. However, if the threaded holes were formed in plate 15 and the hole and groove were formed in the left surface of plate 12, adjustment would be from the back of the mirror, i.e., from the left of plate 15.

The effective contact point of screw 20 depends on the depth of hole 30. If the hole is of a depth that the center of curvature of the ball end of screw 20 lies in the plane of surface 27, the effective contact point will be in the plane of surface 27. If the hole is deeper (or shallower), the effective contact point will be beneath (or above) the plane of surface 27. The same applies for the effective contact point of screw 22.

Kinematic Mount According to the Invention

Figure 2:
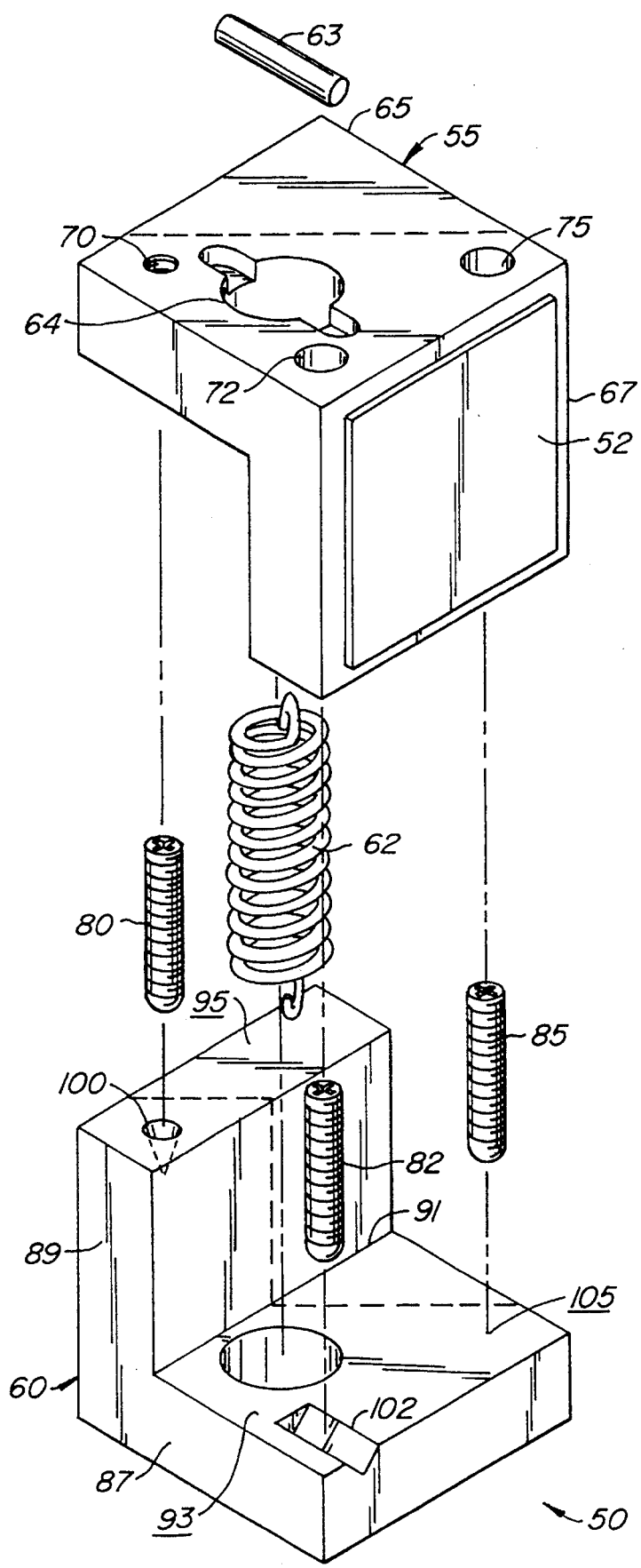
FIG. 2 is an exploded isometric view of a first embodiment of a kinematic mount according to the present invention.

FIG. 2 is an isometric exploded view of a kinematic mount mechanism 50 according to a first embodiment of the present invention. As in the above example, the purpose of the mount is to provide for adjustable tilt of a vertically mounted mirror 52, but the structure of the kinematic mount is modified so that the tilt adjustment can be made from the top rather than from behind or in front of the mirror.

To this end the mount includes first and second L-shaped bracket elements 55 and 60, referred to respectively as the mirror support and the base. Each bracket element has two plates, and the two bracket elements are in a facing relationship to define opposed portions of a rectangular section tube (but for the spacing imposed by the kinematic mount).

The two bracket elements are biased toward each other by a tension spring 62 or by any other suitable mechanism, including gravity. Tension spring 62 is coupled to mirror support 55 by use of a tension pin 63. The tension spring passes through a hole 64 in the mirror support and is attached to tension pin 63 by a loop in the end of the spring. The length of the tension pin is greater than the diameter of hole 64 and the tension pin is seated in a groove on the top of the mirror support. Tension spring 62 may be coupled to base 60 in a similar manner.

Mirror support 55 has a horizontal upper plate 65 and a vertical depending right plate 67. Mirror 52 is mounted to the right surface of the right plate. The upper plate is formed with three screw holes 70, 72, and 75 near its front left corner, its front right corner, and its rear right corner, respectively. While hole 70 only penetrates the thickness of upper plate 65, the other holes also extend through right plate 67 along vertical axes in the plane of the right plate. The centers of the three screw holes preferably define three corners of a rectangle.

The purpose of holes 70, 72, and 75 is to support respective adjustment screws 80, 82, and 85. The adjustment screws preferably have a hemispherical or ball end. The end of screw 80 protrudes from the bottom surface of upper plate 65, while the ends of screws 82 and 85 protrude beyond the bottom edge of right plate 67. To this end, hole 70 is preferably threaded along its entire length (which is only the thickness of the upper plate). On the other hand, each of holes 72 and 75 may be sized over most of its length to clear its respective adjustment screw (including the head if any), and threaded only near the lower end of the hole. This makes it possible to use shorter screws, but requires that the Allen key or screwdriver be sufficiently long to reach the screws.

Base 60 has a horizontal lower plate 87 and an upwardly extending vertical left plate 89, which come together along an inside corner edge 91. Lower plate 87 has an upper horizontal surface 93 and left plate 89 has an upper horizontal edge surface 95. Left plate 89 is formed with a conical hole 100 in the upper horizontal edge surface 95 near the front of the horizontal edge. Lower plate 87 is formed with a V-groove 102 in the upper surface 93 near its left front corner, and a portion of the upper surface 93 defines a flat bearing surface 105 near its right rear corner. Thus conical hole 100 is spaced above the upper surface of lower plate 87.

When the mirror support and the base are biased toward each other, the end of screw 80 seats in conical hole 100, the end of screw 82 seats in V-groove 102, and the end of screw 85 contacts bearing surface 105. A desired relative orientation of the two bracket elements is obtained by adjusting the three screws. Screw 82 is typically adjusted to set the nominal separation of the plates and screws 80 and 85 are adjusted to set the tilt. If there is no need for the kinematic mount to provide an adjustable relative height of mirror support 55, screw 82 can be replaced by a fixed hemispherical protrusion or ball. Movement of screw 80 causes relative rotation about a line joining the contact points of screws 82 and 85 while movement of screw 85 causes relative rotation about a line joining the contact points of screws 80 and 82.

While the bracket elements are shown as having rectangular plates, significant portions of upper plate 65, lower plate 87, and left plate 89 can be removed while maintaining full functionality of the kinematic mount. Dashed lines are drawn in FIG. 2 showing how the brackets could be formed to use less material.

Figures 3, 4:
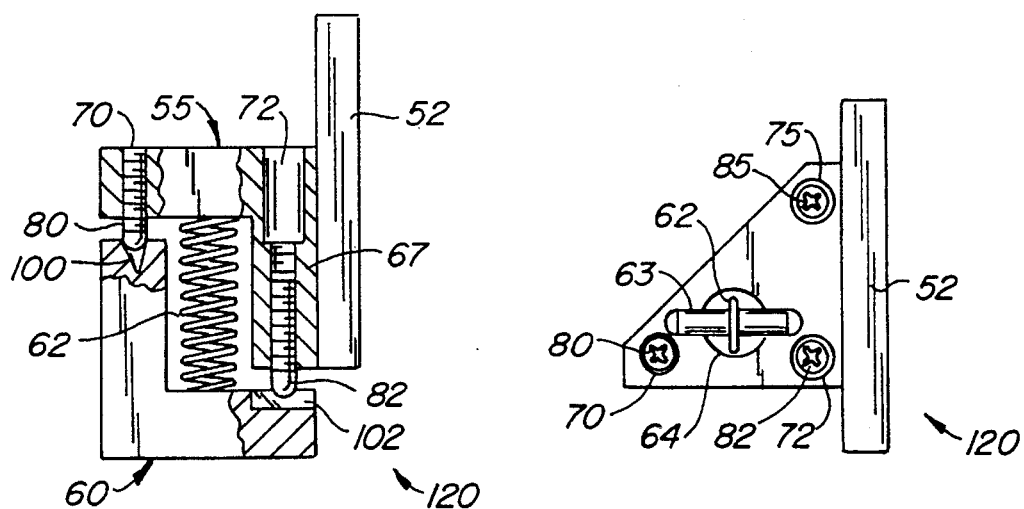
FIG. 3 is a side view of a second embodiment of a kinematic mount according to the present invention.
FIG. 4 is a top view of the second embodiment of a kinematic mount according to the present invention.

FIGS. 3 and 4 are side and top views of a second embodiment 120 of the present invention. Elements functionally corresponding to those of FIG. 2, even if modified, are provided with the same reference numerals as those of FIG. 2. Upper plate 65 is shown reduced to a somewhat triangular shape as was discussed earlier. Mirror 52 is also shown to be substantially larger than right plate 67.

Figure 5:
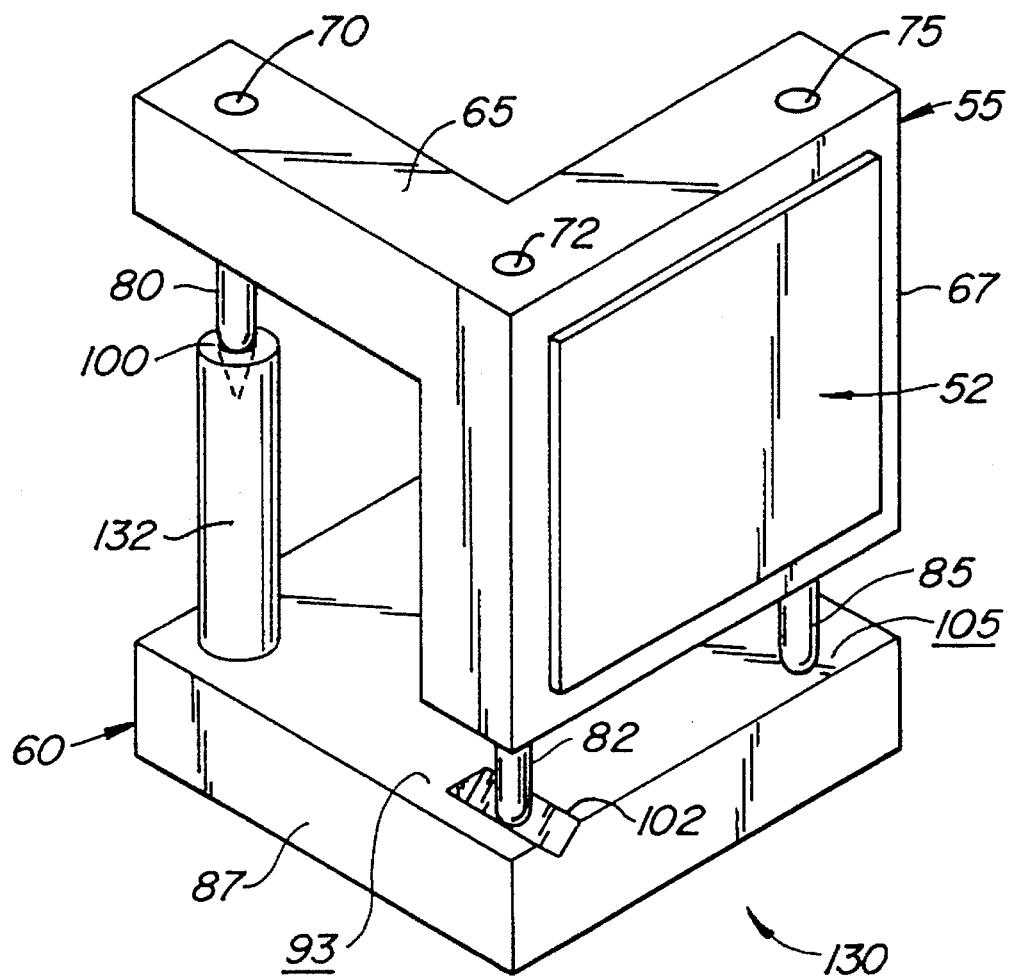
FIG. 5 is an isometric view of a third embodiment of a kinematic mount according to the present invention.

FIG. 5 is an isometric view of a kinematic mount mechanism 130 according to a third embodiment of the present invention. In this embodiment there is no tension spring; rather, the two bracket elements are biased toward each other by the force of gravity. Consequently, horizontal upper plate 65 may be reduced to an L-shape. Additionally, the vertical plate of base 60 has been replaced by a post 132. The post has conical hole 100 on the top circular surface.

Rotational Characteristics of the Invention

Figure 6:
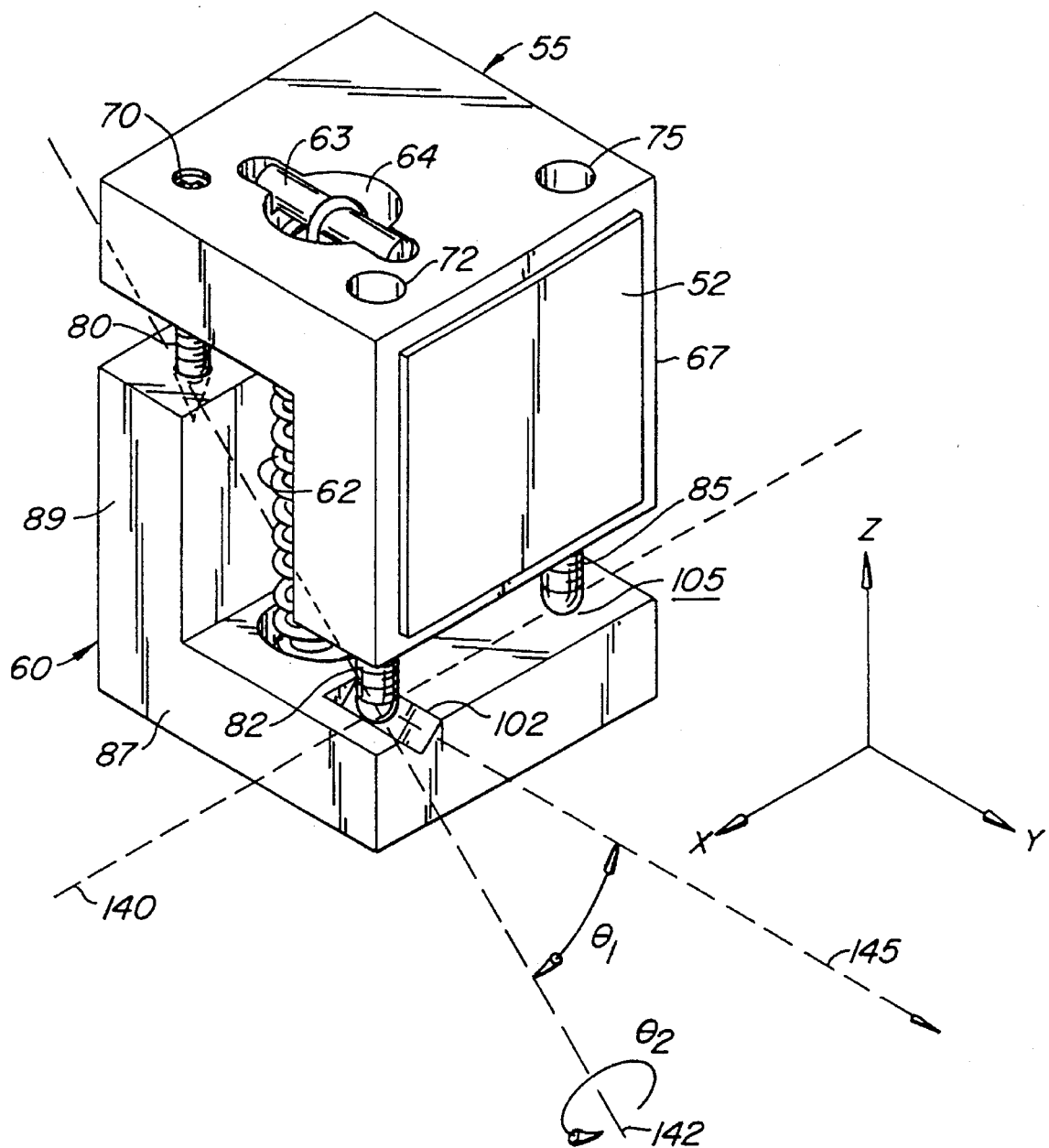
FIG. 6 is an isometric view of the kinematic mount of FIG. 2 according to the present invention with reference axes indicated.

FIG. 6 is an isometric view of kinematic 50 (shown in exploded view in FIG. 2), showing how the tilt of mirror 52 can be adjusted. It is convenient to define a coordinate system with the z-axis pointing up, The y-axis pointing to the right, and the x-axis pointing toward the viewer.

The three contact points between screws 80, 82, and 85 and base 60 define a reference plane, with a pair of rotation axes 140 and 142 lying in the reference plane. Rotation axis 140 is defined by the contact points of screws 82 and 85, and extends parallel to the x-axis. Rotation axis 142 is defined by the contact points of screws 82 and 80, and lies in the y-z plane. The mirror normal is designated with reference numeral 145, and in a nominal zero-tilt position, is parallel to the y-axis.

The adjustment screws are parallel to the plane of the mirror. In a conventional kinematic mount, the adjustment screws are perpendicular to the reference plane for a nominal zero-tilt position. However, in the kinematic mount of the present invention, the direction of the adjustment screws is at a significant angle (say 20–70 degrees) from being perpendicular to the reference plane for the nominal zero-tilt position.

Adjustment of screw 80 causes the mirror to rotate about axis 140, while adjustment of screw 85 causes the mirror to rotate about axis 142. Although the rotation about axis 142 may affect the normal to the mirror, the following will show that the change is minimal for small rotational values.

Still referring to FIG. 6, mirror normal 145 is a unit vector which is shown to be generally parallel to the y-axis. An angle $\theta_1$ is the angle between mirror normal 145 and axis 142. An angle $\theta_2$ is the angle of rotation of the mirror support about axis 142. When mirror normal 145 is parallel to the y-axis as depicted in FIG. 6, angle $\theta_2$ is defined to be zero.

Let nx, ny, and nz be the components of mirror normal 145 along the x, y, and z axes, respectively. As shown in FIG. 6, nx= 0, ny= 1, and nz= 0. As angle $\theta_2$ is changed by adjusting screw 85, the values of nx, ny, and nz vary according to the following equations:

$$nx = \sin(\theta_1) * \sin(\theta_2)$$

$$ny = \cos^2(\theta_1) + \sin^2(\theta_1) * \cos(\theta_2)$$

$$nz = \sin(\theta_1) * \cos(\theta_1) * (1 - \cos(\theta_2))$$

As shown in the equations above, nz is a cosine function of angle $\theta_2$. Thus for small values of angle $\theta_2$, mirror normal 145 remains substantially parallel to the x-y plane.

As an example, if angle $\theta_1$ is 45 degrees and angle $\theta_2$ is 2 degrees, then the above equations solve to the following:

nx= 0.025 ny= 0.9997 nz= 0.0003

Therefore, for relatively small values of angle $\theta_2$, significant tilt about the z-axis is provided while the mirror normal remains substantially parallel to the x-y plane. The amount of tilt is proportional to $\sin\theta_1$, where typical values for $\theta_1$ range from 20 to 70 degrees.

Conclusion

In conclusion it can be seen that the present invention provides a kinematic mount with near orthogonal rotation of an element, in a general vertical plane, to be achieved from above. While the above is a complete description of specific embodiments of the invention, various modifications, alternative constructions, and equivalents may be used. For example, the locations of conical hole 100 and V-groove 102 may be interchanged without affecting the functionality of the mount. Therefore, the above description should not be taken as limiting the scope of the invention as defined by the claims.

What is claimed is:

1. A kinematic mount comprising:
   a first element having three engagement elements, at least two of which are adjustable protrusions; and
   a second element having three engagement portions configured to engage said engagement elements at three respective effective contact points;
   said three effective contact points being non-collinear so as to define a reference plane;
   said adjustable protrusions having generally parallel axes of travel that are at a significant angle from being perpendicular to said reference plane.

2. The kinematic mount of claim 1 wherein said three engagement elements are adjustable protrusions, thereby allowing said first and second elements to be adjustably translated relative to one another without relative rotation.

3. The kinematic mount of claim 1 wherein: said engagement portions include a portion surrounding a hole, a portion surrounding a groove, and a portion defining a flat surface; and
   said engagement elements are protrusions, one of which seats in said hole, one of which seats in said groove, and one of which contacts said flat surface.

4. The kinematic mount of claim 3 wherein said hole is a conical hole and said groove is a V-groove.

5. The kinematic mount of claim 3 wherein:
   said portion surrounding said groove is generally coplanar with said flat surface; and said portion surrounding said hole is significantly displaced above said flat surface.

6. The kinematic mount of claim 1 further comprising at least one biasing element for maintaining said engagement elements in engagement with said engagement portions.

7. The kinematic mount of claim 1 wherein the angle between the axes of travel of said adjustable protrusions and said reference plane is from 20 to 70 degrees.

8. The kinematic mount of claim 1 wherein the angle between the axes of travel of said adjustable protrusions and said reference plane is approximately 45 degrees.

9. A kinematic mount comprising:

a first L-shaped bracket element having a normally upper horizontal plate portion and a normally vertical depending plate portion, said first bracket element having three engagement elements, at least two of which are adjustable protrusions; and a second L-shaped bracket element, disposed below said first element, having a normally lower horizontal plate portion and a normally vertical upstanding plate portion; said second bracket element having three engagement portions configured to engage said engagement elements at three respective effective contact points;

wherein at least one of said engagement elements is coupled to said upper horizontal plate portion of said first bracket element and at least one of said engagement elements is coupled to said vertical plate portion of said first bracket element; and wherein at least one of said engagement portions is located on said horizontal plate portion of said second bracket element and at least one of said engagement portions is located on said vertical plate portion of said second bracket element.

10. The kinematic mount of claim 9 further comprising at least one biasing element for maintaining said engagement elements in engagement with said engagement portions.

11. The kinematic mount of claim 9 wherein said vertical plate portion of said second bracket element is a post.

12. The kinematic mount of claim 9 wherein:

said first bracket element is rotatable about first and second axes;

said first axis being defined by two of said contact points which are generally on the same portion of said second bracket element;

said second axis being defined by two of said contact points which are not on the same portion of said second bracket element; and said second axis being at a significant angle from a normal to said vertical portion of said first bracket element.

13. The kinematic mount of claim 12 wherein the angle between said second axis and said normal is from 20 to 70 degrees.

14. The kinematic mount of claim 12 wherein the angle between said second axis and said normal is approximately 45 degrees.

15. The kinematic mount of claim 9 wherein the motion of said adjustable protrusions is not perpendicular to the plane defined by said contact points.

16. The kinematic mount of claim 9 wherein said three engagement elements are adjustable protrusions, thereby allowing said first and second bracket elements to be adjustably translated relative to one another without relative rotation.

17. The kinematic mount of claim 9 wherein:

said engagement portions include a portion surrounding a hole, a portion surrounding a groove, and a portion defining a flat surface; and said engagement elements are protrusions, one of which seats in said hole, one of which seats in said groove, and one of which contacts said flat surface.

18. The kinematic mount of claim 17 wherein said hole is a conical hole and said groove is a V-groove.

19. The kinematic mount of claim 17 wherein:

said portion surrounding said groove and said flat surface are located on said horizontal plate portion of said second bracket element; and said portion surrounding said hole is located on said vertical plate portion of said second bracket element.

20. The kinematic mount of claim 9 wherein:

at least one biasing element is a spring having two ends such that one end is coupled to said first bracket element and the other end is coupled to said second bracket element.

21. The kinematic mount of claim 9 wherein:

said adjustable protrusions are generally cylindrical having a first end, a second end, and a middle;

said first end being generally rounded and engaging said engagement portion;

said second end having a means for rotating said protrusions; and said middle being at least partially threaded.

22. The kinematic mount of claim 21 wherein:

said first bracket element has at least two vertical holes;

said holes being at least partially threaded on the inside; and said adjustable protrusions are located at least partially within said holes engaging said holes such that rotating said adjustable portions rotates said first bracket element along the axis defined by the other two contact points.

23. The kinematic mount of claim 9 further comprising:

a mirror coupled to said vertical plate portion of said first bracket element.

* * * * *